Sept. 2, 1969     P. M. HANKISON ET AL     3,464,186

DRYER FOR COMPRESSED FLUID SYSTEMS

Filed Feb. 10, 1967     5 Sheets-Sheet 1

INVENTORS
Paul M. Hankison &
William Foster Walker

INVENTORS
Paul M. Hankison &
William Foster Walker

INVENTORS
Paul M. Hankison and
William Foster Walker.
BY
THEIR ATTORNEYS

Sept. 2, 1969    P. M. HANKISON ET AL    3,464,186
DRYER FOR COMPRESSED FLUID SYSTEMS
Filed Feb. 10, 1967    5 Sheets-Sheet 5

INVENTORS
Paul M. Hankison and
William Foster Walker.

//www.free-ocr.co/ no

3,464,186
DRYER FOR COMPRESSED FLUID SYSTEMS

Paul M. Hankison, Peters Township, Washington County, and William Foster Walker, Bethel Park Borough, Allegheny County, Pa., assignors to Hankison Corporation, Canonsburg, Pa., a corporation of Pennsylvania Continuation-in-part of application Ser. No. 547,115, Mar. 22, 1966. This application Feb. 10, 1967, Ser. No. 637,860
Int. Cl. B01d *41/00, 50/00*
U.S. Cl. 55—163 29 Claims

ABSTRACT OF THE DISCLOSURE

A drying tower is disclosed which is capable of periodic regeneration. The tower is employed within a pressurized system, and regeneration of the desiccant is accomplished by periodically backflowing a portion of the compressed fluid through the desiccant material at reduced pressure. In some embodiments, regenerating means are coupled between a compressor or other source of pressurized fluid and the drying tower in order to reduce the moisture content of the fluid before entering the tower to facilitate regeneration of the desiccant and to provide a dryer end product. In other arrangements, the drying tower is provided with an annular passage and spiral vane for the purpose of whirling the incoming pressurized fluid to separate oil droplets and other foreign matter before the incoming fluid reaches the desiccant.

The present application is a continuation-in-part of our co-pending, co-assigned application entitled "Dryer for Compressed Fluid Systems," filed March 22, 1966, Ser. No. 547,115 now abandoned, which in turn is a continuation-in-part of our co-assigned application entitled "Air Dryer for Compressed Air Systems," filed Apr. 5, 1965, Ser. No. 445,639 (now abandoned).

This invention relates broadly to means for extracting moisture from compressed fluids including air and other gases and more particularly to an improved means for dehydrating compressed fluids such as air in compressed fluid systems utilized, for example, in air brakes for vehicles, paint spraying units, communication line purge systems and other commercial applications as well as in laboratories and the like where a supply of moisture-free compressed fluid is required. Although this specification will be more particularly describing an application of the invention in the environment of an air brake system for vehicles such as trucks, and buses, it should be understood that the application of invention is much broader based than that and may be adapted for use in many other systems including but not limited to those mentioned above.

Referring now more particularly to air brake systems for vehicles, the desirability of providing moisture-free air for such systems has long been recognized because of the dangers arising from clogging or corroding the system not to mention freezing when moisture is allowed to collect in it. It will be understood that in using the term "moisture" in this specification, we are primarily referring to water vapor but the term is also meant to include entrained water and oil or oil vapors as well as other contaminants. Various devices for dehydrating compressed air before it enters the air brake system have been proposed, but apparently none of these devices have proven practical since there is nothing available commercially as a practical method or piece of equipment to accomplish this purpose. An earlier proposed means for dehydrating compressed air in such systems was to insert between the air compressor and the storage tank or receiver for the compressed air a container which contains an air filter such as wire mesh, for example, or a chemical drying agent known as a desiccant or both. The dryer was expected to pick up the moisture from the compressed air as it passed through the container and thereby provide moisture-free air for the receiver. A problem that naturally arose in such a drying agent is that ultimately the drying agent would become saturated with the moisture it picked up and would be unable to remove any more moisture. In a practical sense then, it is necessary that the drying agent be periodically replaced or be regenerated or dehydrated itself to achieve a workable system. Heretofore, others skilled in the art have attempted to solve this problem by various devices such as for example those shown in U.S. Patents Nos. 2,079,100 to Begg and 2,440,326 to Cadman. Begg provided a spare cartridge which when not in use was engaged with an attachment to the exhaust manifold of the truck engine to direct air heated by the hot exhaust from the manifold through the drying agent to dry it out while an alternate dryer chamber was being used to dry the compressed air. This involved a routine of switching the dryers as need arose and should work for many applications except for the inconvenience of attendant physical exertion in changing the cartridges and that it requires regular maintenance to effect the switching with the attendant danger of human error in failing to make the switch at some critical time. Cadman invented an improved regeneration means which was much simpler to maintain than Begg, but still failed to eliminate the human error factor. Cadman provided twin dryer columns with separate plumbing for each arranged so that one was dehydrated while the other was in use. It requires the operator to reverse two valves to switch from one dryer to the other. Cadman regenerated by using heat, which circulated through special plumbing incorporated in the dryer, supplemented by flowing a portion of the compressed dry air back through the filter not in use, again through special plumbing.

On the other hand, the process of desiccant regeneration without external application of heat is well known, for example see U.S. Patents Nos. 3,182,435 to Axt; 3,080,693 to Glass et al.; and 2,955,673 to Kennedy et al. In all of these patents various forms of external plumbing and valving systems are required between the desiccant container and the storage tank in order to regulate the flow of regenerative fluid from the storage tank to the desiccant container or from an external purge tank inserted between the storage tank and the desiccant container. When used in conjunction with the brake systems of highway vehicles, such as trucks and the like, the systems disclosed in these patents are too large and bulky for proper installation in such vehicles. Moreover, the many external plumbing and valving connections in these systems make such systems readily subject to malfunctioning from vibrational and other shock forces.

In many states, codes prohibit the extraction of regenerative fluid directly from the storage tank to the desiccant container such as occurs in the patents to Kennedy et al. and Axt. Although Glass et al. attempts to solve this problem by the interposition of a separate purge tank between the desiccant container and the storage tank, the use of this separate purge tank considerably increases the total bulk of the equipment. Moreover, the added purge tank of Glass et al. multiplies the number of plumbing connections between the desiccant container and the storage tank and thus considerably increases the probabilities of damage or other malfunctioning within the system.

In none of the aforementioned patents or in any of many other patents in this field of which we are aware, are there any adequate means for separating lubricating oil inevitably injected into the compressed fluid system by the compressor. Although many types of oil filters are known for extracting such oil, none of these separators are capable of removing substantially all of such lubricating oil, which usually exists in the compressed air system as a mist of microscopic dimensions. Known types of oil filters tend to become rapidly clogged and require frequent replacement. Because of human error such requirement for periodic replacement or servicing in a vehicular brake system is inconsistent with highway safety.

It is essential to prevent the aforementioned oil vapor or mist from reaching the desiccant material, as adsorption of oil thereby, interferes with the adsorption of water vapor by the desiccant. As a result, the useful life of the desiccant is considerably shortened by the presence of oil in the system. Moreover, adsorption of oil by the desiccant also interferes with the proper and periodic regeneration thereof and to reduce further the life of the desiccant material.

We have invented an improved heatless dehydrating apparatus that eliminates the maintenance and human error factor associated with previous devices because it is automatically and virtually indefinitely self-regenerating. Our drying system is self-regulating and self-compensating. In contrast with conventional drying arrangements requiring two drying towers for alternative drying and regeneration, our system is a single-tower arrangement which is auto-regenerative. Our single drying tower is automatically regenerated by equipment associated therewith when its primary drying function is interrupted in accordance with the invention. The amount of air called for the compressed air system influences the compressor on-off cycle which in turn controls the regenerating or purging cycle automatically.

Moisture begins to condense out of ambient air when the air temperature reaches its dew point temperature. Compressing ambient air raises its dew point temperature and accounts for the fact that compressing air is normally accompanied with substantial quantities of moisture vapor capable of condensation. Low ambient temperature operation requires a low dew point. High ambient temperature operation permits the dew point to be somewhat higher. Our system compensates for variations in ambient temperature by always producing a dew point in the compressed air that will be lower than ambient temperature, i.e., as the ambient temperature drops so does the dew point of the effluent compressed air from the dryer, thus eliminating the danger of water collecting in the storage tank or operating lines.

Our invention also takes advantage of the fact that, when dry, high pressure air is expanded, the relative humidity of such air is further reduced such that it will very readily adsorb moisture present in its new environment.

Moreover, our invention greatly simplifies and reduces the apparatus heretofore required in such devices and thus is more economical with respect not only to lower initial cost but in case of installation and maintenance-free service. In particular, our invention reduces the number of plumbing connections between the desiccant container and the storage tank, and in one form of our invention, means are provided for the heatless regeneration of the desiccant material without extracting regenerative fluid from the storage tank or from an external purge tank. In still another arrangement of our invention, means are provided for preventing the oil, which is almost always *inherently* associated with the compressed fluid output of the compressor, from reaching, contaminating and destroying the effectiveness of desiccant material. In still another arrangement of our invention, means are provided for periodically regenerating the oil separating means so that when used in a vehicular brake system, our apparatus can be utilized over long periods of time without attention from the vehicular operator or maintenance personnel. In still other arrangements of our invention, we preferably arrange the desiccant material, oil separating means, desiccant regenerating means, and all separator regenerator means within a single container, and desirably within a removable cartridge within such container, to minimize the space requirements of the system particularly when used in conjunction with a vehicular brake system and to prevent vibrational and other shock damage to components of our compressed fluid system.

We accomplish the foregoing desirable results by providing an improved means for dehydrating compressed air in an air pressure system having an air compressor and a compressed air receiver comprising a container interposed between the compressor and receiver having a compressed air inlet and a compressed air outlet, said container having a cartridge containing moisture collecting material disposed therein between said outlet and inlet, a first valve means interposed between said outlet and said receiver which is adapted to open when compressed air is being supplied from the compressor to the receiver and to close when said compressed air is not being supplied from the compressor, air metering means communicating the receiver with the outlet side of said chamber, a second valve means adapted to control a passage communicating the inlet side of said chamber with the atmosphere or other low pressure zone and biased normally to close said passage, control means responsive to the attainment of selected air pressures in said receiver and operative to stop further delivering of compressed air from the compressor to the receiver upon reaching a higher selected pressure in the receiver and simultaneously open said second valve means whereby a reverse air flow of dry compressed air is set in motion from said receiver through said air metering means, said chamber and said passage to said low pressure zone to purge moisture collected in said chamber from said chamber and further being operative upon reaching a lower selected pressure in the receiver to start further delivery of compressed air from the compressor to the receiver and simultaneously close said second valve means.

In one embodiment of our invention the first valve means has a valve disc member which controls the opening and closing of the container compressed air outlet and said air metering means comprises an opening in said valve disc member communicating the receiver with said container compressed air outlet.

In another embodiment said air metering means comprises a passage communicating the compressed air outlet side of the container with the receiver at a point downstream of, or bypassing the container compressed air outlet, said passage having passage restricting means disposed therein which may, if desired, be adjustable whereby the amount of compressed air passing therethrough may be selectively varied.

Furthermore, for successful operation of such apparatus we have found that the volume of compressed purge fluid, prior to expansion through the metering means, is substantially less than the volume of the compressed fluid flowing through the dryer in the forward or drying direction. However, preferably in the colder areas, particularly with respect to vehicle air brake systems designed for use in the United States, the air metering means can be set such that a suitable higher percentage of the compressed air can be delivered from the compressor to the receiver in said reverse air flow to maintain a lower dew point.

Still another feature of the invention is the provision of a quick-acting dump valve in the purge cycle of the operation which produces a sort of explosive discharge of air from the chamber to atmosphere or low pressure zone and effectively discharges or blows out a great deal of any moisture collected as drops or in a pool and is a very great assist in the dehydration process.

Still other features of the invention include novel means for filtering or otherwise removing oil and moisture droplets that may be found in the compressed air systems, refrigeration coupled in a novel manner to the compressed air drying system for preliminarily lowering the dew point thereof, and novel means for supporting and preventing dusting in the desiccant material used in the drying tower.

In another advantageous embodiment of our invention we also provide a desiccant drying tower comprising an elongated generally cylindrical shell, a closure member secured to each end of the shell, desiccant-drying means contained within said shell, conduit and check valve means mounted in one of said closure members for communicating external equipment with the interior of said shell, inlet passage means extending through one of said closure members and communicating with the interior of said shell, said last-mentioned closure member in addition having valved exhaust passage means extending therethrough in communication with said shell interior.

In one arrangement of our invention we provide a compressed fluid drying apparatus for use in compressed fluid systems having fluid compressor means and compressed fluid receiver means said apparatus comprising a container having a chamber therewithin and coupled between said compressor and said receiver means, said container having fluid inlet means, fluid outlet means and fluid exhaust means communicating with said chamber, filtering means disposed in said chamber between said inlet and outlet means such that fluid flowing through said inlet and said outlet means must flow through said filtering means, said exhaust means being disposed between said inlet and outlet means adjacent the inlet side of said filter means, first valve means controlling the flow of fluid through said outlet means, second valve means controlling the flow of fluid through said exhaust means, and fluid metering means disposed in said container adjacent the outlet side of said filter means and communicating said receiver means with said chamber such that fluid flowing through said fluid metering and exhaust means must flow through said filtering means. In one arrangement for removing lubricating oil and other foreign matter from the drying tower we provide a desiccant-containing cartridge spaced inwardly of the shell to form an annular plenum. We then dispose a spiral vane or equivalent within the annular plenum to impart a swirling motion to the compressed fluid moving therethrough to remove the foreign matter by centrifugal action.

To prevent vibration and attrition of the desiccant material we admix a quantity of a buffer material, for example shredded polystyrene, Teflon, or open-celled polyurethane or a combination of these.

For a more compact desiccant container for use in a compressing and dehydrating system for gases and the like, our novel container includes a chamber structure for supporting a mass of desiccant material therein, purge chamber means mounted within said container adjacent said desiccant chamber, differential flow control means mounted within said container and disposed between said purge chamber means and said desiccant chamber, said differential flow control means being capable of transmitting compressed fluid in one direction at a greater volumetric rate than in the other, and exhaust valve means mounted in a wall portion of said container and juxtaposed to said desiccant chamber so that fluid flowing in said opposite direction passes through said desiccant chamber and thence through said exhaust valve means, an outlet of said exhaust valve means being disposed for exhausting to a region of lower pressure. In another arrangement of the container an oil separator generally of perforate plate-like construction is positioned within said container and between said desiccant chamber and said exhaust valve means, said oil separator being extended entirely across the flow path of incoming and exhaust fluid streams of said container, said oil separator being spaced from the adjacent end of said desiccant chamber. In still other forms of the container said purge chamber means and said desiccant chamber are separated by a domed flow baffle, and said differential flow control means are mounted on said baffle. To minimize attrition of the desiccant, a perforated plate member is slidably mounted in said container between said baffle and said desiccant chamber, said plate member defining the adjacent end portion of said desiccant chamber, and biasing means are confined between said baffle and said plate member and are disposed to exert force upon said plate member and desiccant material contained in said desiccant chamber.

Any of the aforementioned forms of our invention can be arranged for use with vehicle brake systems or the like where regenerative back-flow from an external storage tank is prohibited or undesirable. In this connection the desiccant container is provided with an outlet communicating with said purge chamber, a conduit couples said outlet to an external storage tank, and a check valve is coupled in said conduit, said check valve permitting flow only from said outlet to said storage tank.

For use in cyclic systems such as those described herein, we provide another form of oil separator including a relatively thin filtering member, a pair of complementarily shaped perforated backing plates co-extending with said disc and sandwiching said disc therebetween, said separator being positioned within said system such that a relatively low volume flow therethrough in one direction causes contaminating oil to coalesce on the downstream side of said low volume flow, and a relatively high volume flow in the opposite direction through said separator drives said coalesced oil back through said separator and out of said system to periodically purge said separator. Alternatively, a porous, self-supporting structural member can be substituted for the thin member and perforated backing plates omitted. For example, a sintered material of various shapes and having the necessary thickness to be self-supporting can be utilized.

These and other details, objects and advantages of the invention will become apparent as the following description of certain present preferred embodiments thereof proceeds.

In the accompanying drawings, we have shown certain present preferred embodiments of the invention in which:

FIGURE 9 is a longitudinally sectioned view of still another embodiment of the drying tower used in our improved arrangement for dehydrating compressed air or the like;

Figures 1, 2, 3, 4, 5:
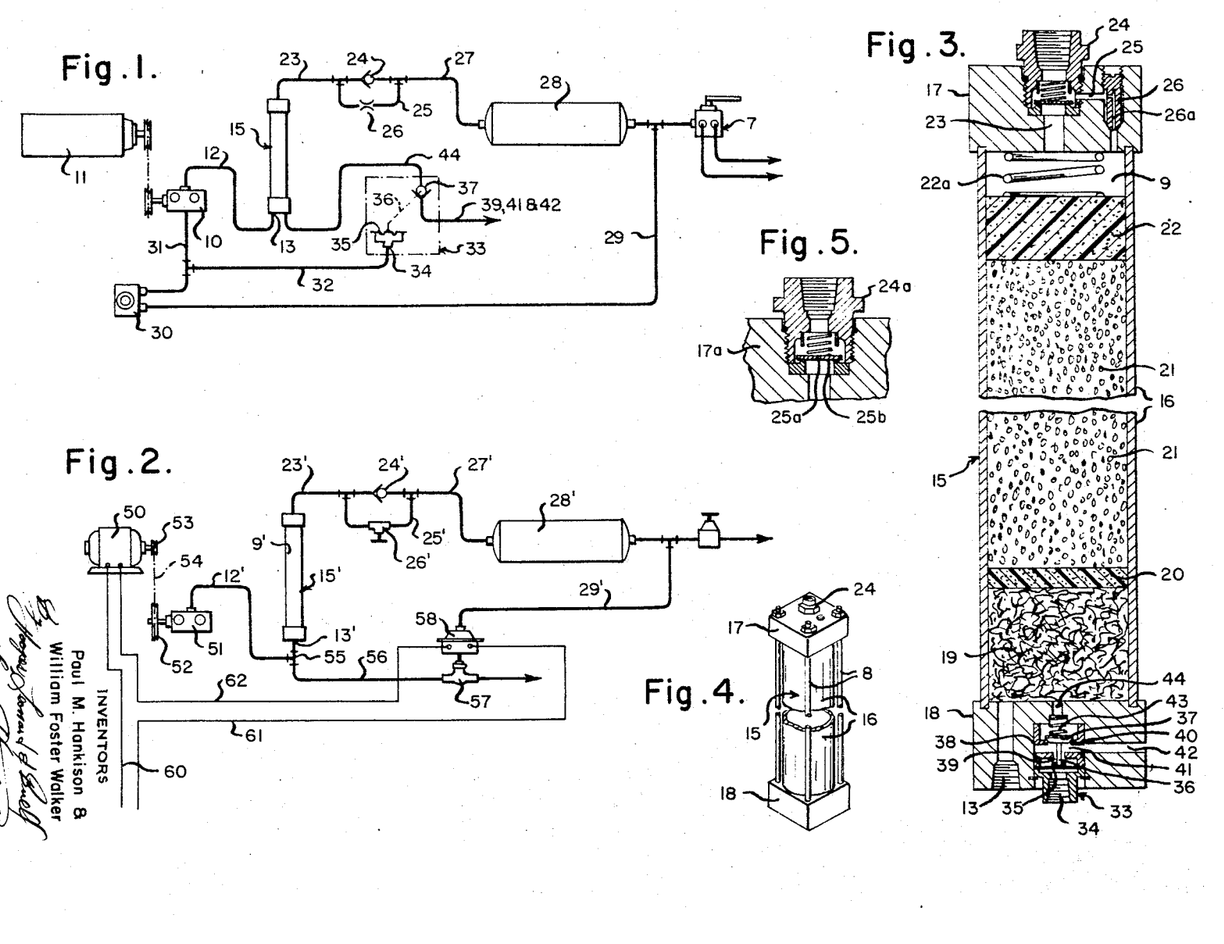
FIGURE 1 is a diagrammatic illustration of one form of our gas compressing and drying system adapted exemplarily for use with a typical vehicle air-brake system.
FIGURE 2 is a diagrammatic illustration of another form of our gas compressing and drying system having an electrical control system and an electrical motor as the compressor driving means.
FIGURE 3 is a vertical cross-sectional view of one form of drying tower used in our improved apparatus for handling compressed gases.
FIGURE 4 is a fragmentary reduced isometric view of the drying tower of FIGURE 3.
FIGURE 5 is a partial vertically sectioned view of an embodiment of the air metering means incorporated in the valve controlling the compressed air outlet of the drying tower of FIGURES 4 and 5.

Referring now more particularly to the drawings, we have shown in FIGURE 1 a compressed air system for supplying air to an air-brake system for a vehicle in which a compressor 10 is suitably coupled to and driven by the vehicle's engine 11 when said engine is being operated. In general, air that is compressed by compressor 10 travels through line 12 to a tower inlet port 13 of a drying tower 15, through drying tower 15 and outlet port 23 thereof, through line 27 to a receiver such as reservoir tank 28 where the compressed air is stored. Conventional air-brake valving and piping as generally indicated at reference 7 draws upon reservoir tank 28 for compressed air to operate the air brakes of the vehicle as needed and when called upon to do so by the vehicle operator.

Referring to FIGURE 3, the container or drying tower 15 has a cylindrical wall 16, a head member 17 and a base member 18 which are assembled to contain therein a chamber 9. Container 15 may be held in assembly by appropriate means such as by welding, by threaded engagement or by bolted tie rods 8 extending through suitable openings in members 17 and 18, as shown in FIGURE 4. Disposed in chamber 9 is a moisture removing filter which may comprise desiccant or mesh or any moisture removing material suitable for the purpose. We have found a combination of materials admirably suitable for this filter to be as follows: stainless steel wire mesh 19 adjacent inlet port 13 which removes the heavy moisture or droplets very well, followed by a desiccant 21 such as silica gel or activated alumina which extracts moisture in the vapor state. The desiccant 21 is contained at the ends respectively by a porous foam disc separator 20 fabricated for example from foam rubber and a cellulose acetate pad 22 both of which also provide additional moisture and oil vapor removal ability. A spring 22a is biased between head 17 and pad 22 to hold the dehydrating assembly 19–22 together and whereby the desiccant particles in particular are prevented from movement which tends to allow the individual particles to vibrate against each other and form injurious dust.

In accord with another feature of the invention, means can be admixed directly with the desiccant material 21 to ensure further the prevention of vibration and attrition among the individual particles of the desiccant material. In the latter arrangement, a quantity of a shredded resilient material inert to moisture and lubricants, such as shredded polystyrene, shredded Teflon, shredded open cell polyurethane or any combination of these is admixed with the desiccant 21. The shredded material acts as a buffer to prevent relative particle movement. When using shredded foamed polyurethane, we have found that a ratio of about 70% desiccant to 30% shredded material by volume, yields excellent results, with improved results being obtained when using such material in the range of 15%–40% shredded material. Even better results have been obtained when using shredded polystyrene or Teflon materials in a ratio of 80% desicant to 20% shredded material and in the range of 10%–30% shredded material respectively. "Teflon" is a trademark owned by Du Pont for a polytetrafluoroethylene. Because of the differing particle sizes of the shredded material and desiccant and the voids normally existing among the desiccant particles, the desiccant and shredded material can be packed into almost the same space that would be required by the desiccant alone. In addition to preventing particle dusting or attrition, the shredded material which, desirably, substantially fills the voids among the desiccant particles, acts to force the gases or fluids into more intimate contact with the desicant particles to increase the drying efficiency thereof.

A check valve 24 is threadedly engaged with head member 17 to prevent the back flow of air when the drying chamber 9 is depressurized. It will be understood that compressed air being forced through inlet port 13 will pass through chamber 9 and there be dehydrated before exiting chamber 9 through outlet port 23 and check valve 24 into line 27 leading to reservoir tank 28. Check valve 24 prevents the compressed air from returning from tank 28 back into chamber 9.

Conventional means for controlling the supplying of compressed air by compressor 10 to tank 28 is provided as follows. Referring to FIGURE 1, a line 29 delivers air under pressure from the reservoir 28 to a governor 30 which establishes the maximum pressure under which compressed air is to be stored within the reservoir and also determines the minimum pressure of same at which time the compressor is to be activated to furnish additional compressed air to said reservoir. At maximum pressure, governor 30, through suitable internal valving, is activated by the air pressure from tank 28 and directs the same air pressure through line 31 to an unloading valve in the head of compressor 10 causing the inlet valve of the compressor to be opened and held in this position and thus prevent compressor 10, even though running, from supplying additional compressed air to the system. Still referring to FIGURE 1, governor 30 when activated as just described additionally operates to open a second valve means in the form of a dump valve 33 which is securely engaged in base member 18.

Conversely, when the compressed air pressure in reservoir 28 reaches the minimum selected pressure, governor 30 is activated to cut off the air pressure to line 31 which allows the inlet valve of the compressor to open and close in its normal manner and thereby restart the delivery of compressed air from compressor 10 to reservoir 28 and also causes spring biased dump valve 33 to close and remain closed so long as compressed air is being so delivered.

Referring to FIGURE 3, it can be seen that dump valve 33 controls a passage from the inlet side of chamber 9 to a low pressure zone such as atmosphere. This passage, as there shown, comprises passages 44 and 42 in base member 18 interrupted by dump valve 33 which is spring biased normally to close the connection between passages 44 and 42. Returning to FIGURE 1, dump valve 33 has an inlet 34 which is connected to a line 32 which taps the air pressure in line 31 between governor 30 and compressor 10. Thus, when governor 30 operates to shut off the supplying of compressed air by compressor 10 by releasing air under pressure into line 31, it also supplies air under pressure to line 32 which actuates dump valve 33 as follows. The compressed air enters valve 33 at its inlet 34 and forces a diaphragm 35 and valve stem 36 upwardly against spring 43. This unseats disc 37 from seat 40 and opens passage 44 through central valve bore 39 and an intersecting passage 41 which extends through valve wall 38 to exhaust passage 42 and atmosphere. Thus, when compressor 10 is being inhibited from supplying air to tank 28 by governor 30, dump valve 33 at the same time is being held open by governor 30 whereby chamber 9 is opened to atmosphere via collective passages 44, 39, 41 and 42. The foregoing provides the exhaust portion of a system for purging chamber 9 of moisture it has collected from the incoming compressed air delivered from compressor 10.

The importance of a quick-acting dump valve 33 should be pointed out here. By quick-acting we mean that the exhaust opening to atmosphere be of a sufficient size to promote and facilitate a sort of sudden or explosive reaction from chamber 9 therethrough when valve 33 is opened wherein the high pressure air in chamber 9 is released to atmosphere very rapidly and carries with it the heavy moisture and oil such as drops or pools that have collected in the coarse portion of desiccant-filter, particularly in the foam disc 20 and steel mesh 19 adjacent the bottom of the tower and its exhaust passage 42–44, and thereby ejects or eliminates the heaviest part of the moisture from the chamber. If the exhaust opening is too small it suppresses this explosive force and does not satisfactorily remove the heavy moisture. The size of the exhaust opening will, of course, depend upon the size of chamber 9, i.e., the larger the chamber 9, the larger the exhaust opening must be in order to yield the desired explosive-like force. For example, we have found that an exhaust opening of one-fourth inch diameter works admirably well for a chamber 9 of about sixty cubic inches and that an exhaust opening of one-eighth inch diameter for a chamber 9 of this size is not sufficiently large to provide a quick-acting dump valve in the sense that we have just described.

On the intaken end of the purge system, which is on the compressed air outlet side of chamber 9, we provide a passage 25 in head member 17 and valve 24 which thruogh line 27 connects reservoir tank 28 to the compressed air outlet side of chamber 9 and by passes outlet port 23. An air metering member 26 is interposed in passage 25 to control the amount of purge air permitted to flow through passage 25, such amount being limited by the size of the restricted opening 26a in member 26. The size of opening 26a may be varied by inserting other members 26 into passages 25 with restricted openings of different sizes or by utilizing a member 26 with a needle valve to control or vary the size of opening 26a.

In operation, the purge of chamber 9 occurs as follows. Whenever receiver tank 28 is filled with compressed air to the degree preselected to activate governor 30, governor 30 actuates the mechanism to stop compressor 10 from supplying additional compressed air and simultaneously opens valve 33 to vent chamber 9 to atmosphere. When this occurs, the high pressure air in chamber 9 very rapidly or explosively escapes to atmosphere carrying with it the heavy moisture collections in the chamber. Simultaneously, some of the dry compressed air from tank 28 reverses and commences to flow back through line 27, passage 25, and into chamber 9, being metered, of course, through restricted opening 26a. This dry compressed air rapidly expands as it is metered through restricted opening 26a, and drops even further in relative humidity so that, in passing through the desiccant in chamber 9 and then dump valve 33 to atmosphere, it readily picks up or adsorbs and carries out with it the moisture previously adsorbed by the desiccant in chamber 9.

We have found that in an air-brake system for vehicles such as trucks and buses operated in the United States where the compressed air usually is stored in a reservoir at approximately 100 p.s.i., that a conveniently sized chamber is sufficiently well suited to remove the moisture contained in the compressed air under the most adverse of humidity conditions likely to be experienced at any time of the year in this country. Further, in such air brake systems, the compressor seldom pumps more than half the time. Under these circumstances, similar time is available for reactivating the desiccant, if necessary, and to maintain chamber 9 in a substantially continuously purged or regenerated condition. The proper purge rate for the apparatus just described is determined by the diameter of the compressed air metering opening 26a.

It will be understood by those skilled in the art that in a specific example of the above apparatus the sizes, settings and rates aforementioned will vary with the different conditions and varying environment that arise in applying our invention to different jobs and various applications of compressed fluid systems. The principal that is to be observed is to first provide a purge rate that is high enough to accomplish its regenerating mission and yet low enough so as not to become impractical or uneconomical in terms of percent of compressed air used for purging to total compressed air output.

Figure 7:
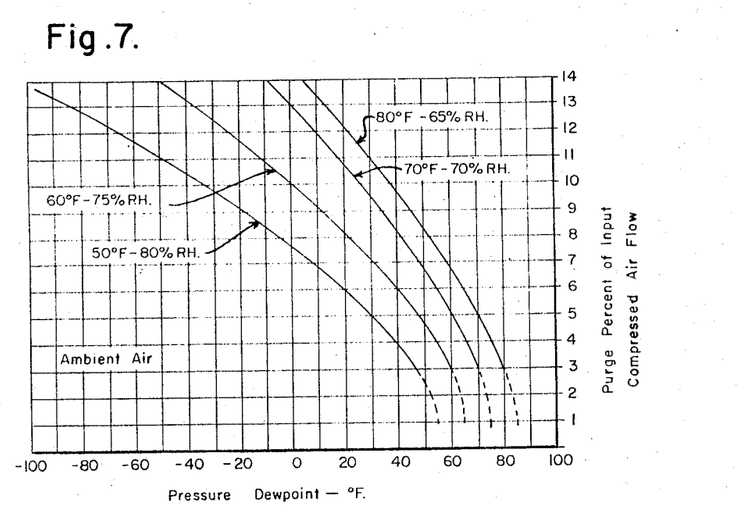
FIGURE 7 is a graph showing the dew point temperature of compressed air as a function of the purge rate percent of compressed air input.

Further, in this respect, we have from experimental data prepared a chart, FIGURE 7, which shows the dew point temperatures of certain ambient air samples compressed to approximately 100 p.s.i., shown in the curves as a function of purge rate percentage of compressed air input. Since it is desirable to maintain a dew point in the air in the system substantially below the dew point of the ambient air, one selects the desired dew point intersecting the curve representing the air condition under consideration and then reads across to the required purge rate for producing such a result. As can be seen from the chart, a minimum purge rate can be selected to maintain a dew point at or below the dew point of the compressed ambient air. It will be understood that where the compressed air dew point is permitted to be higher than the temperature of the ambient air, condensation will occur. Preferably, to avoid any possibility of this, the dew point of the compressed air should be 40 to 60° F. lower than the ambient air temperature. Referring to FIGURE 7, to maintain such a difference, the chart shows that a minimum purge rate of about 10 to 12% will accomplish this.

The recommended dew point depression is particularly necessary and advantageous where our invention is utilized in an air brake system for vehicles, which it will be understood may be subjected to highly differing ambient air temperatures in very short periods of time. In more static circumstances such as in communication line applications, a lower purge rate of say 6% would be satisfactory. A purge rate of from 10 to 12% is not excessive in a vehicle air brake system, for even with unusual brake usage, far more compressed air than this is available for purge or rejuvenation purposes.

In another embodiment of our invention shown in FIGURE 5, we simply provide a compressed air metering opening 25a in valve disc 25b of the valve 24a threadedly engaged with head member 17a. This connects receiver tank 28 with the outlet side of chamber 9 and eliminates providing the bypass means 25–26a earlier described and shown in FIGURE 3. However, this arrangement is not as convenient for changing the size of the metering opening as is the arrangement shown in FIGURE 3.

Referring to FIGURE 2 of the drawings, there is shown still another embodiment of our invention. In the description following, those components which correspond to like components of FIGURE 1 are designated with the same reference numerals and a prime suffix.

In this embodiment, an electric motor 50 is coupled to a compressor 51 by suitable means such as by pulleys 52, 53 and belt 54. Compressed air is delivered from compressor 51 through a pipe 12' to a T 55 which is threaded into inlet port 13' of tower 15'. A pipe 56 is connected from T 55 to a valve 57, the purpose of which will be explained later.

Compressed air is directed through tower 15' into and through pipe 27' to reservoir 28' for storage in the same manner described for FIGURE 1. Means are provided for interrupting the supplying means (compressor), when the preselected upper pressure is reached within reservoir 28'. This means, as shown, is a conventional pressure switch 58 which will register the pressure supplied from reservoir 28' through pipe 29' to pressure switch 58 and trip an electric switch within this unit causing the circuit to the electric motor 50 to be opened. At the same time that the pressure switch 58 opens the motor circuit, it opens valve 57 to vent pipe 56 and thus chamber 9' to atmosphere. Opening of valve 57 permits the system to purge chamber 9' in a manner similar to that previously described for the system of FIGURE 1. Dry air from the reservoir 28' will flow through pipe 27', through valve 26', through chamber 9' of tower 15' in a reverse direction to remove the moisture present in chamber 9', through the inlet port 13', T 55, pipe 56 and out opened valve 57 to atmosphere.

When the pressure within reservoir 28' falls to the preselected minimum pressure, the diaphragm within pressure switch 58 reverses itself by the pressure setting spring within said unit and closes the circuit to the motor 50 through electrical lines 60, 61 and 62, which, of course, starts up the compressor again. Closing of the switch also reverses the position of the valve 57 from open position to a closed position whereby the compressed air is directed again into drying tower 15'.

In the embodiment shown in FIGURE 2, we have also replaced member 26 and its fixed orifice 26a, shown in FIGURE 3, with an adjustable needle type valve 26'. The purpose here being that the purge rate can thus be adjusted to suit conditions by simply adjusting the needle valve to permit a larger or smaller volume of dry compressed air to return through the filter during the reverse moisture removal cycle.

Figure 6:
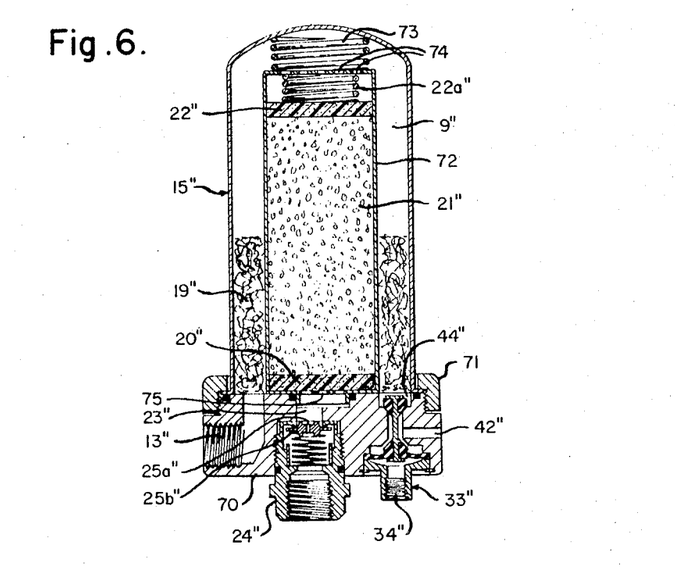
FIGURE 6 is a longitudinally sectioned view of another embodiment of our novel drying tower.

FIGURE 6 illustrates still another embodiment of our drying tower. In the description following, those components which correspond to like components of FIGURE 3 are designated with the same reference numerals and a double prime suffix.

In this embodiment a base 70 contains both a compressed air inlet port 13" and a compressed air outlet port 23". A check valve 24" is threadedly engaged in base 70 to control the flow of compressed air through outlet port 23" as heretofore described with respect to FIGURE 3. A cannister-type tower 15" having a chamber 9" is seated on base 70 and secured thereon by the threaded ring 71. A cartridge 72 is disposed within chamber 9" and tower 15" and is at least partly surrounded with a stainless steel wire mesh 19". Cartridge 72 contains a cellulose acetate pad 22", a desiccant 21" and a porous foam rubber disc 20" as its filtering elements and spring 22a" to prevent movement. Spring 73 holds cartridge 72 in place within chamber 9". Cartridge 72 has openings 74 at one end which communicate with chamber 9" and openings 75 at the other end which communicate with outlet port 23".

Referring to FIGURE 6, it will be understood that the compressed air flow is through inlet port 13" into chamber 9" filtering through mesh 19", then through openings 74 into cartridge 72, through the filter in cartridge 72 and exiting through openings 75 into outlet port 23".

Also contained in base 70 is dump valve 33" which controls exhaust passage 42"–44" communicating chamber 9" with a low pressure zone such as the atmosphere. The air metering means for purge air is illustrated in this instance as an opening 25a" in valve disc 25b" of the valve 24".

It should be noted that cartridge 72 effectively seals off outlet port 23" and air metering opening 25a" from inlet port 13" and exhaust passage 42"–44" such that they are in communication only through cartridge 72.

The purge or regeneration cycle for this embodiment is the same as that described with regard to the embodiment shown in FIGURE 3, when the governor shuts off the compressed air supply, quick-acting dump valve 33" opens chamber 19" suddenly to atmosphere and the heavy moisture and lubricating oil is thereby blown out. Simultaneously, dry compressed air from the storage tank flows back through metering opening 25a" and rapidly expands and flows back through cartridge 72 in chamber 9, out through openings 74 into chamber 9" and then out through dump valve 33" to atmosphere, picking up or adsorbing and carrying with it the moisture remaining therein.

The particular advantage of the embodiment shown in FIGURE 6 is that it permits the utilization of a disposable filter-dryer cartridge which is conveniently and readily replaceable.

Figure 8:
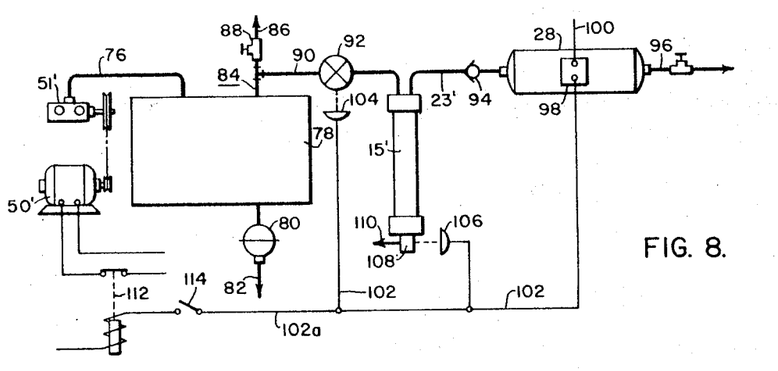
FIGURE 8 is a diagrammatic illustration of a compressed gas system illustrating another form of our improved arrangement for dehydrating compressed air or other gases.

With reference now to FIGURE 8 of the drawings, another form of compressed gas system arranged in accordance with our invention is illustrated therein. In the ensuing description of FIGURE 8, similar reference characters with primed accents are used to denote similar components of any of the preceding figures. In the latter arrangement, then, a compressor 51', driven by suitable driving means, such as electric motor 50', supplies compressed air or other gas containing a usual amount of moisture through conduit 76 to a conventional refrigerated drying unit 78. The dryer unit 78 condenses a significant quantity of the moisture vapor contained in the air, which moisture is collected in condensate trap 80 from which it is periodically discharged to a drain (not shown) through conduit portion 82.

In this arrangement, the dew point of the air flowing through the refrigerated dryer 78 is lowered nearly to the freezing point, for example, to about 35° F. The partially dried output air is conducted from the dryer unit 78 through a branched conduit network 84, with conduit branch 86 being provided with a throttling valve 88 for variably or intermittently supplying partially dried air to various external equipment or processes (not shown) not requiring thoroughly dried air.

A primary portion of the refrigerated output, however, is conducted through conduit branch 90 to desiccant tower 15'. A remotely actuatable stop valve 92 is coupled in the power inlet conduit 90. In this example, the stop valve 92 can be provided in the form of a conventional, normally open solenoid valve. The desiccating tower 15' can be provided in the form of any of the desiccating towers described previously or in the form of that presently to be described in connection with FIGURE 9 of the drawings.

The outlet of the tower 15' is coupled through conduit 23' to a storage tank 28' for the thoroughly dried output air of the desiccant tower 15'. A conventional, reverse metering or bleed check valve 94 is coupled in conduit 23' so as to permit full volume flow from the desiccant tower 15' to the storage tank 28'. The reverse bleed check valve 94 can be provided with an apertured valve disc or valve seat in accordance with known practice to permit relatively small reverse bleed or metered flow from the storage tank to the desiccant tower 15' for the regenerative purposes described above.

In the present example, where the dew point of the incoming air through conduit 90 is pre-cooled in the refrigerated dryer 78 as aforesaid to a dew point of about 35° F., the desiccant tower 15' is enabled to achieve a significantly lower dew point than that possible with the compressed air systems of FIGURES 1 and 2. In this example, the dew point of the thoroughly dried air supplied to the storage tank 28' from the desiccant tower 15' is in the neighborhood of −40° F. or less.

The storage tank 28' is provided with a valved outlet conduit designated generally by reference character 96 for supplying thoroughly dried air to external equipment or processes. The storage tank 28' also is provided with a pressure-sensitive switch 98 of known design, arranged in this example to close its internal switching means (not shown) at a predetermined upper pressure limit within the tank 28' and to maintain its internal switch in the closed position until a predetermined lower pressure limit is attained within the storage tank, at which time the internal switch is again opened. The pressure-sensitive means 98 is supplied from a source of potential (not shown) through conductor 100. The electrical output of the pressure-sensitive switch 98 is conducted through branched electrical conductor system denoted generally by reference character 102, to the solenoid operator 104 of valve 92 and to the solenoid operator 106 of dump valve 108 coupled in this example to the lower end of the desiccant tower 15'.

In the operation of the invention, as arranged in FIGURE 8, ordinary air from the ambient atmosphere or other suitable source is compressed and supplied to the refrigerating unit 78 by the compressor 51' where the dew point of the compressed air is lowered initially to a temperature close to freezing. Part or all of the refrigerated air is then conducted through conduit 90, with the valve therein being set for the desired amount of very dry air, to the desiccant tower 15' where it is further dried to a dew point of —40° F. or less. The desiccant tower output is conducted through outlet conduit 23' and check valve 94 for storage in tank 28' for subsequent use.

When the pressure in the storage tank 28' reaches a predetermined upper limit, under impetus of compressor 51', the pressure-sensitive means 98 is actuated to emit an electrical signal to the solenoid operators of normally open inlet valve 92 and normally closed dump valve 108. Actuation of the stop valve 92 terminates the flow of refrigerated air to the desiccant tower 15' and simultaneous opening of dump valve 108 rapidly reduces the pressure within the desiccant tower 15' to that of the ambient pressure. This reduction in pressure within the desiccant tower then permits a regenerating back or reverse bleed flow through the check valve 94 to the tower 15' from the storage tank 28'. The regenerating bleed flow continues through the tower 15', where it escapes to the atmosphere through exhaust conduit 110, until the pressure within the storage tank 28' drops to the lower predetermined limit. At this time the pressure-sensitive means 98 terminates the signal on conductor system 102 to permit the inlet stop valve 92 to open and the dump valve 108 to close, after which the drying and regenerating cycle is repeated.

It is contemplated, in the operation of the air system as depicted in FIGURE 8, that the compressor 51' and driving mean 50' need not be shut down during the regenerative portion of the tower operating cycle. Thus, when the tower inlet valve 92 is closed as described above, the entire output of the refrigerated dryer unit 78 is conducted through the conduit branch 86 to the aforementioned equipment or the like coupled thereto. On the other hand, depending upon the demand of partially dried air, the compressor and its driving means 50' can be shut down through the opening of a normally closed relay switch 112 and pressure switch output conductor portion 102a, the use of which can be rendered optional by the provision of a manually operable switch 114 in the conductor 102a.

Figure 9:
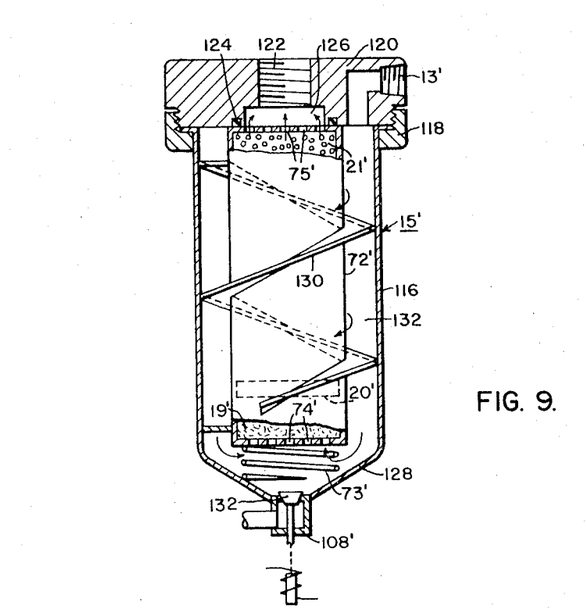

Referring now to FIGURE 9 of the drawings, another form of the drying tower of the invention is illustrated, with components of similar construction to that of any of the preceding figures being identified with similar reference characters having primed accents. The drying tower of FIGURE 9 is generally similar to that shown in FIGURE 6 but is provided with modified inlet, outlet and dump arrangements, and also with means for imparting a swirl to the incoming and dumped air flowing through the tower for the purpose of removing suspended oil or other foreign matter from the system.

In the arrangement of FIGURE 9, then, the desiccant tower 15' includes the generally cylindrical container 116 having a mounting flange 118 at the upper opening thereof for securance to an apertured cover 120 having a tapped outlet opening 122 therein. A sealing ring 124 is spacedly secured to the undersurface of the cover plate 120 so as to define an outlet plenum 126 therebetween. When thus secured, the sealing 124 is aligned with desiccant cartridge 72' when properly positioned within the container 116 by means of compressed spring 73' disposed at the lower, frusto-conical section 128 of the container 116.

The cartridge 72' is further positioned and centered within the outer container 116 by means of a spiral vane 130 secured about the outer wall surface of the cartridge 72' and described in greater detail hereinafter. As set forth previously, the cartridge 72' can contain in the major proportion of its volume a desiccant 21' separated from a filter material 19' such as wire mesh, by means of a porous partition member 20'. The filter material 19' thus is confined to the inlet end of the cartridge 72'.

When thus mounted, the cartridge is spaced inwardly from the outer container 116 to define an annular plenum chamber 132, which communicates with the tapped port 13'.

The input air of the tower 15' thus flows generally downwardly through the annular plenum 132, but is swirled by the spiral vane 130 interposed as aforesaid between the catridge 72', and the inner wall surface of the container 116. This swirling action throws oil particles or other suspended foreign matter in the input air against the inner wall surfaces of the outer cotnainer 116, where it runs down to the frustro-conical collector section 128 at the bottom end of the container 116.' The frusto-conical section 128 then conducts the extracted foreign matter toward the central expeller or dump opening 132 of the container. Thus, when air is dumped from the tower at the initiation of its regeneration, the sudden outrush of air through the dump opening 132 and dump valve 108' carries with it the undesirable foreign matter which is thus collected from the inner wall surfaces by the frusto-conical section 128.

Referring now more particularly to FIGURES 10 to 13 inclusive of the drawings, the further embodiment of our drying apparatus as shown therein includes a desiccant container 200, the outlet 202 of which is coupled through conduit 204 and check valve 206 to the storage tank 28'. The check valve 208 permits full flow through the conduit 204 from the container 200 to the storage tank 28', but does not permit any flow whatsoever in the reverse direction. Thus, there is no differential flow control means between the container 200 and the storage tank 28'. Therefore, no compressed fluid can be withdrawn from the storage tank 28' to the container 200 at any time, as during the regenerative portion of the cycle for regenerating desiccant material 208 contained within the container 200. The apparatus of FIGURES 10 to 13 can be employed in conjunction with vehicular brake systems without violation of local codes which prohibit extracting purge or regenerative fluid from the storage tank 28'.

The desiccant container 200 is provided with an inlet 210 for connection to the compressor 10 51 or 51' of the systems shown in FIGURES 1, 2 and 8. The container 200 also is provided with a dump or exhaust valve 212 similar to that shown at 33 in FIGURES 1 and 3, at 57 in FIGURE 2, or at 108 in FIGURE 8, and for the same general purposes.

Figure 10:
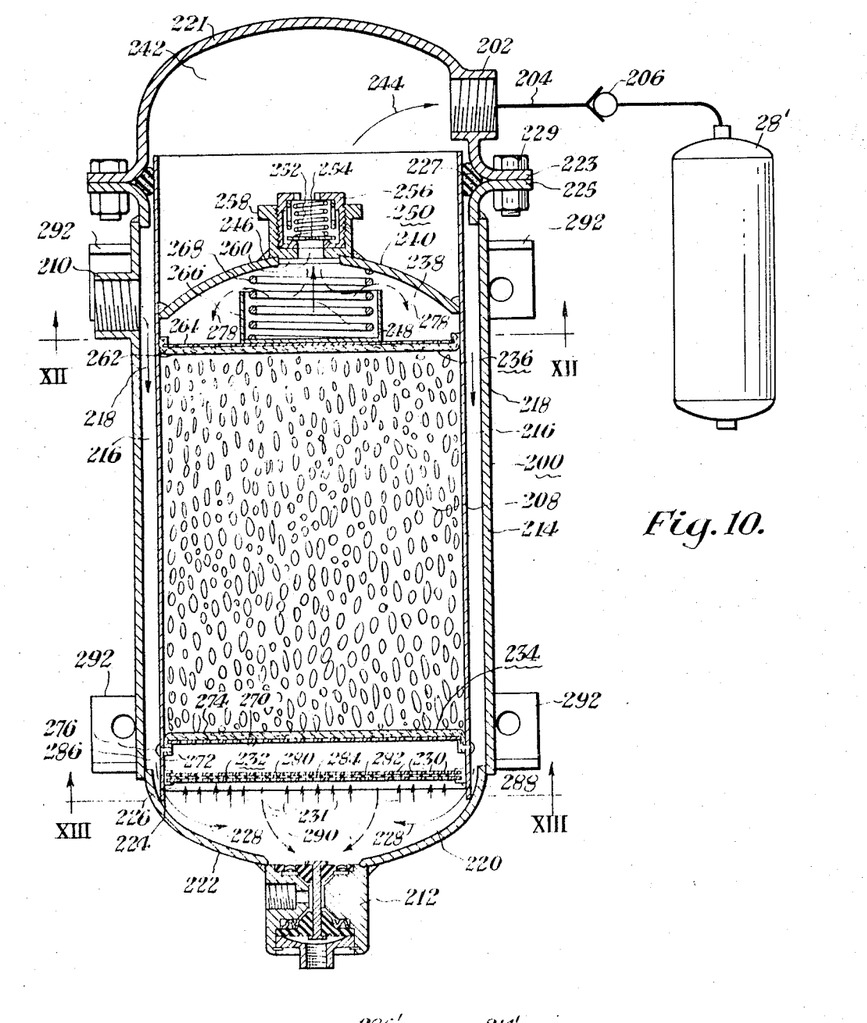
FIGURE 10 is a longitudinally sectioned view of yet another embodiment of our novel drying tower, usable in our improved arrangements for dehydrating compressed gases and having means incorporated therein for prolonging the life of the desiccant material.
Figure 11:
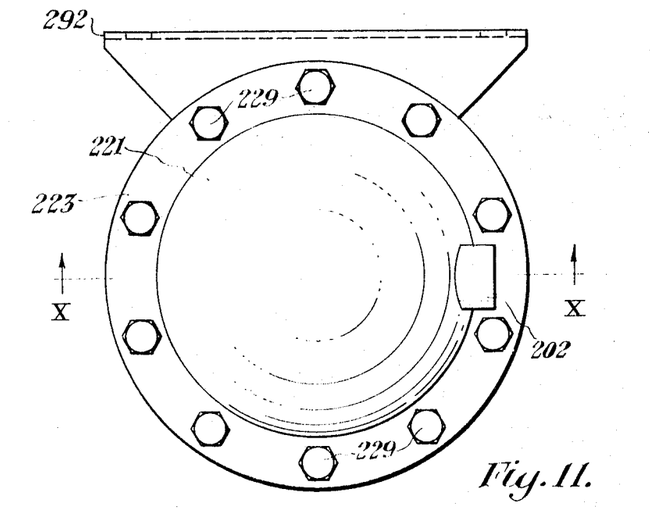
FIGURE 11 is a top plan view of the apparatus as shown in FIGURE 10.
Figure 12:
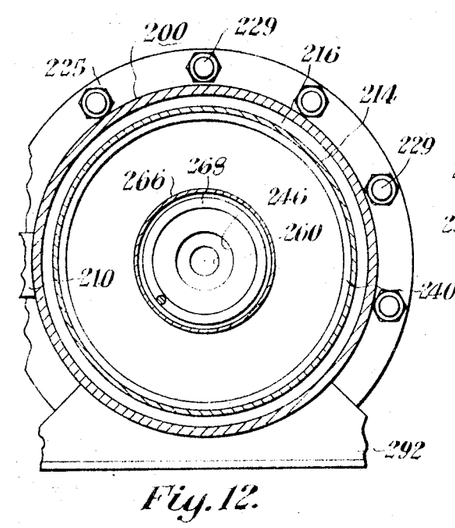
FIGURE 12 is a cross-sectional view of the apparatus as shown in FIGURE 10 and taken along reference line XII—XII thereof.

In this arrangement of the invention, the mass of desiccant material 208, which can be one of the materials mentioned previously, is contained within an inner shell or cartridge 214, which is positioned desirably co-axially within the container 200 and spaced inwardly therefrom to form an annular flow passage or plenum 216. With this arrangement, compressed air entering the container 200 through the inlet 210 flows downwardly through the plenum 216 as denoted by flow arrows 218 to the lower space 220 adjacent a rounded bottom 222 of the container 200. The lower end of the cartridge 214 rests upon the upper reaches of the rounded bottom 222 by means of a plurality of feet 224 spaced around the lower extremity of the cartridge 214, with three such feet 224 being utilized in this arrangement as better shown in FIGURE 14. Between the feet 224, deeply chamfered areas 226 of the lower extremity of the cartridge 214 permit the compressed fluid to flow between the feet 224 as denoted by flow arrows 228, into the bottom plenum area 220 of the container 200. In this example, the rounded bottom 222 serves to position the lower end of the cartridge 214 substantially co-axially of the container 200 to provide the annular flow plenum 216 with a uniform radial dimension.

It will thus be seen that the cartridge or inner shell 214 is replaceable together with a desiccant material 208 and an oil separator 232 described more fully below. In furtherance of this purpose, the cartridge 214 is sealed to the upper end portion of container 200 by a unique sealing arrangement which also seals the junction between the container 200 and its top closure 221 which is removably secured to the container 200 through joining flanges 223 and 225 respectively. In furtherance of this purpose, a sealing ring 227 is inserted adjacent the inward junction of the flanges 223 and 225 where tightening of bolts 229 compresses the sealing member 227 between the adjacent extremities of the container 200, its closure 221 and the upper end portion of the cartridge 214. Thus, the sealing member 227 seals the closure 221 to the container 200 and at the same time positions the upper end portion of the cartridge 214 coaxially of the container 200, while sealing the upper plenum or purge chamber 242 of the container 200 from the annular plenum 216 between the container 200 and the inner wall or cartridge 214.

From the plenum 220 the compressed fluid flows upwardly through a number of aperture means 230 in oil separator 232, as indicated by flow arrows 231, and through lower filter pad 234 and thence through the desiccant material 208. From the desiccant material 208 the compressed fluid flows upwardly through upper filter member 236 through an intermediate plenum 238 and thence through a central aperture 246 in domed baffle 240 into an upper plenum 242. From the upper plenum 242 the compressed fluid exits from the container 200 as denoted by flow arrows 244 through outlet 202, conduit 204 and check valve 206 to the storage tank 28'. As pointed out previously, once the compressed fluid is conveyed into the storage tank 28', it cannot be extracted therefrom to the conduit 204 because of check valve 206. Accordingly, no compressed fluid is returned from the storage tank 28' to the container 200 for purposes of regenerating the desiccant 208.

The compressed fluid flows through the central flow aperture 246 of baffle 240 as denoted by flow arrow 248. The flow of compressed fluid through the baffle aperture 246 is controlled by reverse bleed check valve 250, the valve closing member 252 of which is provided with a reverse bleed aperture 254. The check valve 250 otherwise is of conventional design and in this arrangement the housing 256 thereover is threaded into container 258, the lower end of which is apertured at 260 and otherwise further constricts the flow opening 246 of the domed baffle 240. The check valve receptacle 258 in this example is secured to the top surface of the baffle 240 as by welding, as viewed in FIGURE 10.

In this arrangement, the flow baffle 240 desirably is domed inasmuch as a relatively high pressure differential can exist thereacross when the exhaust valve 212 is opened during the regenerative portions of the operating cycle. Thus, the intermediate plenum 238 at such times, together with the desiccant chamber 208, is exhausted within a very short time. On the other hand, the upper plenum 242 which serves as an integral purge chamber for the desiccant material 208, is exhausted at a much slower rate owing to the differential flow control feature of the reverse bleed check valve 250. Therefore, within a very short time after opening the exhaust valve 212 substantially the entire compressor outlet pressure will exist across the domed baffle 240.

The volume of dry compressed fluid normally contained within the upper plenum 242 at the end of the compression cycle is sufficient, after bleeding slowly through aperture 254 of the reverse metering check valve 250 and expanded to substantially atmospheric pressure within the desiccant chamber 208 by exhaust valve 212, to completely regenerate the absorbant material 208.

The upper filter member 236 in this example is slidably mounted within the upper end portion of the cartridge 214 and adjacent the domed flow baffle 240. In a desirable form of the upper filter member 236, a porous filtering pad 262 such as open-celled polyurethane foam is likewise stretched over an apertured, relatively rigid backing member 264, having a somewhat smaller diameter than the inner diameter of the cartridge shell 214. The filter pad 262 is partially wrapped about the periphery of the back-up plate 264 so that the filter member 236 is closely and slidably fitted within the shell 214. The back-up plate 264 can be constructed from perforated sheet steel or other suitably foraminous structural material.

Desirably, the central region of the back-up plate 264 is not apertured where it engages retaining cup 266 for suitable biasing means such as spring 268. The biasing means 268 urges the slidably mounted upper filter pad 236 downwardly against the desiccant material 208 to apply compression thereto. This compressive action minimizes vibration and attrition of the individual desiccant particles within the desiccant chamber.

The lower filter pad 234 is similarly constructed with the exception that the lower back-up plate 270 can be uniformly perforated as shown and is provided with a depending lip 272 whereby the back-up plate and the filter material 274 stretched thereover is positioned in the cartridge shell 214 with rivets 276 or other suitable fastening means.

Spring retaining cup 266 can be omitted if desired whereupon the lower end of the spring 268 can engage directly the upper surface of the upper back-up plate 264. Use of the spring retaining cup 266, however, serves as a catch basin for any particles of foreign matter which may issue through the reverse bleed check valve 250 during desiccant regeneration when purge flow fluid flows from the purge chamber 242 through the intermediate plenum 238 and thence through the desiccant chamber 208 as denoted by reverse flow arrows 278.

The cup 266 as shown in FIGURE 10 is mounted directly beneath the central flow aperture 246 of the domed baffle 240. The reversed regenerating flow from the purge chamber 242 through the check valve aperture 254 is caused to disperse radially by the presence of the cup 266 so that a portion of the reverse flow is diverted toward the outer periphery of the perforated back-up plate 264. As a result, the entire mass of the material in the desiccant chamber 208 is exposed to the reverse, regenerative flow from the purging chamber 242.

The oil separator 232, as arranged in accordance with our invention, includes exemplarily a pair of foraminous or, as shown, back-up members 280 and 282 with a relatively thin disc of foraminous or porous material, such as filter paper 284 sandwiched therebetween. The term foraminous as used herein and in the appended claims is inclusive of apertures of uniform or non-uniform sizes, and of porosity such as encountered in the aforementioned filter paper or in finely or coarsely sintered members, and of reasonable equivalents.

Thus, it is contemplated that a relatively thin, finely sintered filtering member 284 can be sandwiched between relatively thick, coarsely sintered backing members 280 and 282 to provide the necessary structural rigidity of the separator 232. Alternatively, a single, relatively thicker but finely sintered filtering member (not shown) or other finely porous filtering member having requisite structural strength to withstand the anticipated pressure drops thereacross, can be employed without one or both of the backing members 280, 282 as described more fully below.

The back-up members 280, 282 and the filter paper 284 are secured together by a clamp or channeled peripheral retaining member 286 which is shrunk or force-fitted into the lower end portion of the cartridge 214 to securely position the oil separator 232 at a location spaced from the lower filter pad 234. As better shown in FIGURES 10 and 13, each of the back-up plates 280, 282 are provided with a relatively large number of apertures, with the respective apertures thereof being desirably in substantial alignment. The imperforate areas of the back-up plates 280, 282 thus provide structural rigidity to the filter paper 284, which would otherwise rupture if substantially larger continuous areas thereof were presented to the incoming compressed fluid (flow arrows 231) and to the explosive discharge of the fluid in cartridge 214 during the initial stage of reactivation. The apertures 230 of the upper back-up member 280 of the oil separator 232 also serve to collect the oil which coalesces on the upper surface of the filter paper 284.

A space 286 between the lower filter pad and the oil separator 232 prevents contact of the upper pad 234 and the desiccant material 208 by the coalesced oil, whose capillarity and wettability otherwise would permit a relatively rapid transfer of the coalesced oil from the separator 232 to the lower filter pad 234.

In the arrangement shown, the filter paper 284 is a resin impregnated filter paper of commercial availability such as Liquid Separator Paper, Run #106024 (0.030" thick), made by Riegel Paper Corp., Paper Division, 260 Madison Avenue, New York, N.Y. 10016. However ordinary filter paper, thin porous metal sheet or sintered metal, porous plastic material or porous glass can be substituted.

It is contemplated that the filtering member 284 and the back-up members 280 and 282, if used, need not be flat but can take any desired and convenient shape such as conical or cup-shaped, as long as the separator 232 extends entirely across the path of the incoming compressed fluid and of the outgoing exhaust or pinge fluid.

Where a somewhat more rigid filter member, such as a sintered member, is used in place of the filter paper 284, the normally downstream back-up member 280 can be omitted where the pressure differential associated with normal, forward flow of compressed fluid (flow arrows 231) are not severe. Where a sintered structural material such as sintered bronze, stainless steel or carbon is employed for the filter member comprising the separator 232, both back-up members can be omitted.

Figure 13:
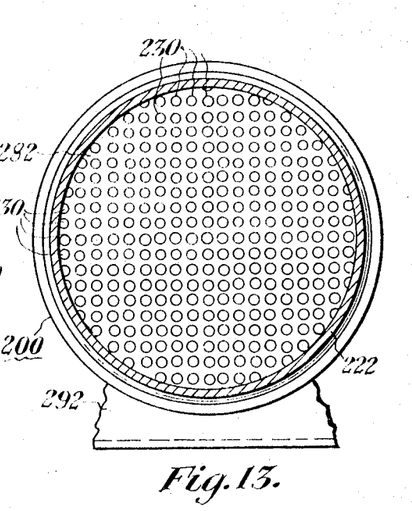
FIGURE 13 is another cross-sectional view of the apparatus as shown in FIGURE 10 and taken along reference line XIII—XIII thereof.

Bypassing of the filter member or disc 284 is prevented by a tightly fitted engagement between the channel retaining ring 288 and the adjacent inner wall portion of the cartridge 214. Since in most compressed fluid systems the contaminating oil exists in the system as a mist of microscopic dimensions, a surface type filter with minute pore size, such as that shown at 284 in FIGURES 10 and 13, is required to coalesce the oil mist. The use of a surface type filter permits the oil separator 232 to be periodically regenerated by high volume flow reversals, in contrast to the use of a depth type filter.

In order to ensure complete purging and regeneration of the oil separator 232, the latter in this example is supported in a horizontal position so that the coalesced oil is largely confined to the apertures 230 of the upper backup plate 280 at relatively low forward flow rates. At higher forward rates, the uprush of air or other incoming fluid through the apertures 230 tends to force the coalesced oil out of the apertures and onto the intervening solid portions of the upper plate 280. At high volumetric reverse flows, the coalesced oil is wiped off these upper plate surfaces and carried back through the apertures 230 and filter disc 234 as described below. In no case, however, does any significant quantity of coalesced oil migrate downstream to the dessicant 208.

It is contemplated in appropriate applications and in modified structures, that the oil separator 232 can be mounted in other than a horizontal position, or that the normal flow of compressed fluid can be reversed so that coalesced oil collects on the underside of the separator 232 and the reverse regenerating flow purges the coalesced oil upwardly through the separator instead of downwardly. In any event, the surface tension of the coalesced oil is sufficient, under most operating conditions, to maintain the coalesced oil on the normally downstream side of the separator without dripping. Where a perforated or other foraminous backing member is employed on the normally downstream side of the separator, the perforations and the intervening surfaces of the backing member offer additional oil-collecting surfaces irrespective of the position of the separator.

When the exhaust valve 212 is periodically opened, the almost explosive outrush of compressed fluid from the intermediate plenum 238, the disiccant chamber 208, and the space 286 between the lower filter pad 234 and the oil separator 232 forces the coalesced oil back through the filter disc 234 and through the apertures 230 of the lower or normally upstream plate 282, and out of the container 200 as denoted by flow arrows 290. In the case of a compressor in proper operative condition, the volume of coalesced oil is seldom sufficient to enter the apertures of the upper back-up member 280 so that the coalesced oil stands upon the upper surface of the normally downstream back-up member 280, which is wetted by the coalesced oil, but there is little or no possibility of wetting the adjacent inner wall portion of the inner shell 214. However, with poorly maintained compressors which pass excessive quantities of lubricant, the entire or upper or normally downstream surface of the oil separator 232 can be completely covered with coalesced oil and the separator can still be properly regenerated by the high volume reverse purge flow. Thus, the separating space 286 prevents the coalesced oil from traveling with the incoming fluid stream to the desiccant material, and the coalesced oil is substantially completely removed from the oil separator during the initial portion of each regenerative interval.

When the aforementioned compressor has restarted or when incoming compressed fluid is otherwise admitted to the container 200, the oil separator is again immediately available for removing oil contaminants.

During the remainder of each regenerative interval and after the initial outrush of compressed fluid from the chambers 238, 208 and 286, regenerative fluid, exiting through the reverse bleed aperture 254 of the check valve 256 continues to flow through the desiccant chamber 208 until the desiccant material is regenerated, at which time the compressing interval of the operating cycle is reinstated.

The oil separator 232 and desiccant 208, then, essentially are regenerated in sequence. The momentary pressure drop which occurs across the oil separator 232 when the dump valve 212 is opened quickly regenerates the oil separator 232, whereupon the relatively slower regeneration of the desiccant material 208 commences. At this time regenerative fluid is conveyed from the upper plenum 242 through the differential fluid control means, including the reverse bleed check valve 250, and through the desiccant material as denoted by flow arrows 278. This flow is substantially at the discharge pressure of the dump valve 212.

It will be seen that the desiccant, the oil separator means 238, the oil separator regenerating means including chambers 208, 238, 286 and the desiccant regenerating means including the upper plenum 242, are all contained within a single container 200 so that the number of external plumbing connections within the system are minimized. The components of the compressing and drying apparatus which are thus contained within the container 200 can be quickly and easily installed or removed as a single unit of the system. The use of the sealing ring 227 in addition to its functions described previously also reduces the amount of vibrational or other shock forces transmitted to the cartridge 214 from the outer container 200.

If desired, a number of brackets 292 can be secured to the outer wall surface of a container 200 for mounting purposes.

Figure 14:
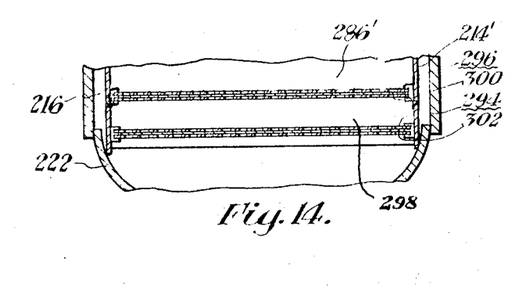
FIGURE 14 is a partial, longitudinally sectioned view illustrating another form of the oil separating means.

Referring now to FIGURE 14 of the drawings, another arrangement of the oil separating means is illustrated therein. It will be understood, of course, that the oil separating means according to either FIGURE 10 or 14 can be utilized in other apparatus than that shown, as long as the system in which the oil separating means are utilized is subjected to periodic flow reversals of the character which will purge the coalesced oil in the manner described.

In the modification of FIGURE 14, a pair of oil separators 294 and 296 are spacedly mounted adjacent the lower end of cartridge 214'. The oil separators 294, 296 are spaced from one another and from the lower filter pad (not shown in FIGURE 14) or other system component with the result that the spaces 286' and 298 prevent oil communication respectively therebetween. The lower oil separator 294 is generally similar to the upper separator 296 and both are constructed substantially in the manner described above in connection with the oil separator 232 in connection with FIGURES 10 and 13. Desirably, the filter disc 300 of the upper separator 296 is provided with a smaller pore size than the lower filter disc 302. With this arrangement, the proportion of removed oil is progressively increased, although it will be understood that the filter discs 300, 302 can be identical depending upon the application of the invention. If desired, additional oil separating means (not shown) can be mounted in a similar manner in series with the oil separators 294, 296 and spaced therefrom and from an adjacent system component (not shown) as set forth in connection with the lower filter pad 234 of FIGURE 10.

From the foregoing it will be apparent that novel and efficient forms of desiccant towers, regenerating systems therefor, and combined refrigeration-desiccation drying systems have been disclosed herein. Although the systems have been described primarily for use with air, it will be apparent that the apparatus can be readily adapted for use with other gases. While we have shown and described certain presently preferred embodiments of the invention and have illustrated presently preferred methods of practicing the same, it is to be distinctly understood that the invention is not limited thereto but may be otherwise variously embodied and practiced within the scope of the following claims.

We claim:

1. A desiccant drying tower comprising an elongated generally cylindrical shell closed at one end, a closure member secured to the open end of said shell, said closure member having inlet and outlet and exhaust ports extending therethrough, an elongated cartridge member containing desiccant material and having inlet and outlet openings at the ends thereof respectively, said cartridge being spaced inwardly of said shell providing an annular inlet plenum chamber therebetween, means for biasing said cartridge into sealing engagement of its outlet openings with said closure member in communication with the outlet port thereof, said exhaust and said inlet ports of said closure member being disposed in communication with said plenum chamber, the inlet end of said cartridge being disposed in communication of its openings with said inlet plenum chamber.

2. The combination according to claim 1 wherein coarse filtering means are contained in said plenum chamber at least in the area thereof adjacent said inlet port and said exhaust port of said closure member.

3. The combination according to claim 2 wherein said closure member contains a reverse metering check valve mounted in its outlet port and also contains remotely operable valve means mounted in its exhaust port.

4. The combination according to claim 1 wherein said shell is open at its upper end and the otherwise closed lower end thereof contains said exhaust port, and a spiral flow deflecting vane is supported in said annular plenum chamber for imparting a swirl to fluid flowing generally downwardly therethrough toward the lower inlet end of said cartridge.

5. The combination according to claim 4 wherein the lower inlet portion of said cartridge contains a coarse filtering material, said lower portion being disposed adjacent said exhaust port.

6. The combination according to claim 4 wherein remotely operable normally closed valve means are mounted in said exhaust port.

7. A desiccant drying tower for fluid material, said tower comprising an elongated generally cylindrical shell, desiccant drying means contained within said shell, conduit means coupled to said shell for communicating external equipment with the interior of said shell, inlet and exhaust passage means coupled to said shell for communication with said shell interior, said tower being coupled to a compressor supplying said fluid material under pressure, and said desiccant drying means including a quantity of desiccant material admixed with a quantity of shredded resilient plastic material, said resilient material being inert to said fluid material and to lubricating oil added thereto by said compressor.

8. A desiccant drying tower for fluid material, said tower comprising an elongated generally cylindrical shell, desiccant drying means contained within said shell, conduit means coupled to said shell for communicating external equipment with the interior of said shell, inlet and exhaust passage means coupled to said shell for communication with said shell interior, said desiccant drying means including a quantity of desiccant material admixed with a quantity of shredded material selected from the group consisting of shredded polystryene, shredded Teflon and shredded open-celled polyurethane.

9. The combination according to claim 8 wherein said shredded material and said desiccant are provided initially in a volume ratio in the range of 10–40% of shredded material.

10. The combination according to claim 8 wherein said shredded material is shredded polystyrene and said shredded material and said desiccant are provided initially in a volume ratio in the range of 10–30% of said shredded polystyrene.

11. The combination according to claim 8 wherein said shredded material is shredded open-celled polyurethane and said shredded material and said desiccant are provided initially in a volume ratio in the range of 15–40% of said shredded polyurethane.

12. The combination according to claim 8 wherein said shredded material is shredded Teflon and said shredded material and said desiccant are provided initially in a volume ratio in the range of 10–30% of said shredded Teflon.

13. A desiccant container for use in a cyclical compressing and dehydrating system for gases and the like, said container including a chamber structure for supporting a mass of desiccant material therein, purge chamber means mounted within said container adjacent said desiccant chamber, differential flow control means mounted within said container and disposed between said purge chamber means and said desiccant chamber, said differential flow control means being capable of transmitting compressed fluid in one direction at a greater volumetric rate than in the other, said differential flow control means acting periodically in response to cyclic reverses in said system, and exhaust valve means mounted in a wall portion of said container and juxtaposed to said desiccant chamber so that fluid flowing in said opposite direction passes from said flow control means and through said desiccant chamber and thence through said exhaust valve means, an outlet of said exhaust valve means being disposed for exhausting to a region of lower pressure.

14. The combination according to claim 13 wherein said purge chamber means and said desiccant chamber are separated by a flow baffle, and said differential flow control means are mounted on said baffle.

15. The combination according to claim 13 wherein said container is provided with an outlet communicating with said purge chamber, conduit means couple said outlet to an external storage tank, and a check valve is coupled in said conduit means, said check valve and said conduit means permitting flow only from said outlet to said storage tank.

16. The combination according to claim 14 wherein a rigid foraminous member is slidably mounted in said container between said baffle and said desiccant chamber, said foraminous member defining the adjacent end portion of said desiccant chamber, and biasing means are confined between said baffle and said foraminous member and are disposed to exert force upon said foraminous member and desiccant material contained in said desiccant chamber.

17. The combination according to claim 13 wherein said desiccant chamber structure is confined within an inner cartridge spaced inwardly of said container to define an annular plenum therebetween, said cartridge and said container each having inlet means communicating with said annular plenum together with outlet means communicating with said purge chamber.

18. The combination according to claim 16 wherein said biasing means is seated in a cup member positioned on said foraminous member, said baffle is provided with a flow aperture, and said cup member is juxtaposed to said aperture to disperse the flow of said fluid from said purge chamber means to said desiccant chamber and to catch and retain any foreign matter in said flow.

19. The combination according to claim 18 wherein said container is elongated and is provided with a removable closure member at one end thereof, said cartridge has an end portion juxtaposed to the junction between said closure member and said container, and a sealing ring is positioned at said junction and between said cartridge and said container, said ring sealingly engaging the adjacent portions of said container and said closure and said cartridge to seal said closure member and said container and to define the adjacent extremity of said annular plenum.

20. The combination according to claim 19 wherein said sealing member positions the adjacent end of said cartridge coaxially of said container, and the other end of said cartridge is positioned coaxially of said container by engagement with an adjacent rounded end portion thereof.

21. The combination according to claim 13 wherein an oil separator generally of foraminous construction is positioned within said container and between said desiccant chamber and said exhaust valve means, said oil separator being extended entirely across the flow path through said desiccant chamber of the incoming and exhaust fluid streams of said container, and means are provided for spacing said oil separator from the adjacent end of desiccant material contained within said desiccant chamber.

22. The combination according to claim 21 wherein said oil separator includes a porous filtering member secured between a pair of perforated back-up members.

23. The combination according to claim 21 wherein said purge chamber means, said differential flow control means, said desiccant chamber, said oil separator and said exhaust valve are located in tandem along the length of said container so that upon opening of said exhaust valve means the compressed fluid contained within said desiccant chamber and in the space between said oil separator and said desiccant chamber flows rapidly through said oil separator to purge coalesced oil from the side of said separator adjacent said desiccant chamber back and through said separator and out said exhaust valve means, and compressed fluid from said purge chamber flowing through said differential control means flows thence through said desiccant chamber at a substantially slower rate.

24. The combination according to claim 21 wherein a baffle is positioned in said container between said purge chamber means and said desiccant chamber, said differential flow control means is mounted thereon, and said baffle, said desiccant chamber and said oil separator are spacedly mounted in tandem within said container.

25. A desiccant drying system for use with a compressed fluid containing desiccant contaminating liquid droplets, said system including a container structure for supporting a mass of desiccant material therein, a separator for said liquid positioned within said container structure, means for spacing said separator from said desiccant material, said separator including a coalescing member of foraminous construction and being extended entirely across the flow path of said fluid through said desiccant, and means within said container structure for periodically reverse-flowing a first portion of said fluid through said separator and for periodically reverse-flowing a second portion of said fluid through said desiccant material for regenerating said separator and said desiccant material respectively.

26. The combination according to claim 25 wherein said regenerative means include means for reverse flowing said second fluid portion through said desiccant material at a relatively slower rate and means for reverse flowing said first fluid portion through said separator at a relatively faster rate.

27. The combination according to claim 25 wherein said regenerating means include a first purge chamber and flow controlling means capable of supplying a controlled reverse flow through said desiccant for regenerating said desiccant material and a second purge chamber capable of supplying a more rapid reverse flow through said separator.

28. The combination according to claim 27 wherein said flow controlling means are mounted on an apertured baffle separating said first purge chamber and said desiccant chamber structure.

29. The combination according to claim 28 wherein a generally cup-shaped member is mounted within said container and adjacent said flow controlling means for catching any foreign matter passing therethrough.

References Cited

UNITED STATES PATENTS

| | | | |
|---|---|---|---|
| 2,753,950 | 7/1956 | Baker et al. | 55—162 |
| 2,942,691 | 6/1960 | Dillon | 55—465 X |
| 3,339,350 | 9/1967 | Sims | 55—457 X |
| 3,347,026 | 10/1967 | Zanker | 55—387 X |
| 3,375,201 | 3/1968 | Winnrall. | |
| 2,994,404 | 8/1961 | Schifferly | 55—316 X |
| 3,022,859 | 2/1962 | Sexton. | |
| 3,066,462 | 12/1962 | Yap et al. | 55—97 |
| 3,147,095 | 9/1964 | Kanuch | 55—163 |
| 3,152,877 | 10/1964 | Kaufman | 55—388 X |
| 3,171,726 | 3/1965 | Roner et al. | 55—387 X |
| 3,182,435 | 5/1965 | Axt | 55—163 X |
| 3,258,899 | 7/1966 | Coffin | 55—179 X |
| 3,323,292 | 6/1967 | Brown | 55—163 X |
| 3,324,631 | 6/1967 | Kreuter | 55—163 |

REUBEN FRIEDMAN, Primary Examiner

J. ADEE, Assistant Examiner

U.S. Cl. X.R.

55—185, 316, 387, 457